US012654791B2

(12) United States Patent (10) Patent No.: US 12,654,791 B2
Fu et al. (45) Date of Patent: Jun. 16, 2026

(54) HYBRID VEHICLE FOR USE IN LUNAR EXPLORATION

(71) Applicants:Hyundai Motor Company, Seoul (KR); Kia Corporation, Seoul (KR)

(72) Inventors: Ernestine Fu, Somerville, MA (US); John Suh, Palo Alto, CA (US)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 532 days.

(21) Appl. No.: 18/136,466

(22) Filed: Apr. 19, 2023

(65) Prior Publication Data

US 2024/0351710 A1     Oct. 24, 2024

(51) Int. Cl.
*B62D 57/028*     (2006.01)
*B64G 1/16*     (2006.01)

(52) U.S. Cl.
CPC .............. *B62D 57/028* (2013.01); *B64G 1/16* (2013.01)

(58) Field of Classification Search
CPC .................................................. B62D 57/028
See application file for complete search history.

(56) References Cited

U.S. PATENT DOCUMENTS

| | | | | |
|---|---|---|---|---|
| 9,957,002 | B2 * | 5/2018 | Klassen ................ | B60F 3/0007 |
| 2020/0117214 | A1 * | 4/2020 | Jonak ........................ | G06T 7/13 |
| 2020/0216127 | A1 * | 7/2020 | Suh .......................... | B25J 18/02 |
| 2022/0106001 | A1 * | 4/2022 | Takasugi ............. | B62D 57/028 |
| 2022/0274657 | A1 * | 9/2022 | Zhang .................. | B62D 57/028 |
| 2023/0211841 | A1 * | 7/2023 | Fu ......................... | B62D 57/032 |
| | | | | 180/8.1 |
| 2023/0211842 | A1 * | 7/2023 | Fu ........................ | B60W 60/001 |
| 2025/0145233 | A1 * | 5/2025 | Kamon ................ | B62D 57/028 |
| 2025/0289520 | A1 * | 9/2025 | Xu ........................... | G06V 20/58 |
| 2025/0291353 | A1 * | 9/2025 | Nguyen ............... | B62D 57/024 |

FOREIGN PATENT DOCUMENTS

| | | | | | |
|---|---|---|---|---|---|
| CN | 110371212 | B | * 12/2020 | ............. | G01S 13/08 |
| CN | 111409726 | B | * 8/2024 | ........... | B62D 57/028 |

* cited by examiner

*Primary Examiner* — Kevin Hurley
(74) *Attorney, Agent, or Firm* — Fox Rothschild LLP

(57)     ABSTRACT

A hybrid vehicle is provided. The hybrid vehicle may comprise a chassis and a plurality of leg-wheel components coupled to the chassis. The plurality of leg-wheel components may be configured to be collectively operable to provide wheeled locomotion and walking locomotion.

16 Claims, 13 Drawing Sheets

(B)

(A)

HYBRID VEHICLE FOR USE IN LUNAR EXPLORATION

BACKGROUND

Technical Field

Embodiments of the present disclosure relate to a hybrid vehicle configured to perform wheels and walking locomotion and configured to support lunar exploration.

Background

Due to its relative proximity to Earth, exploration of the moon has long captivated humanity. Lunar exploration provides the promise of developing technologies that can be used in deeper exploration of the solar system, as well as providing access to lunar resources. However, lunar exploration is incredibly challenging. In addition to the difficult and costly travel to reach the moon, the extreme terrain of the surface of the moon, as well as the lack of atmosphere and vastly varying temperature differentials, provide significant challenges to lunar exploration.

Historically, lunar terrain exploration has been performed using various types of spacecraft including satellites for imaging the surface, lunar landers for landing on the surface of the moon, and lunar rovers for traversing the surface of the moon. Each of these vehicles has limitations in exploring lunar terrain. For instance, satellites are limited to capturing images at a significant distance from the lunar surface, lunar landers are typically static and incapable of moving over lunar terrain, and movement of lunar rovers over extreme terrain is very limited. Exploration for lunar rovers is thus limited to small regions of relatively level terrain.

SUMMARY

Embodiments described herein provide an ultimate mobility vehicle (UMV) capable of walking locomotion that can be used in lunar exploration, also referred to herein as a hybrid vehicle. It should be appreciated that the described embodiments may also be used in the exploration of other objects on earth and in space, such as terrestrial planets, moons, asteroids, comets, etc. The UMV is capable of traversing challenging rocky and cratered terrain that is inaccessible to conventional planetary wheeled rovers, and may be designed to operate under the low gravity, extreme temperature, vacuum, and dusty conditions of the lunar surface. Applications of remotely controlled or autonomous UMVs may include scientific exploration, terrain mapping, resource prospecting, mining, construction, and astronaut assistance.

According to an exemplary embodiment, the hybrid vehicle may further comprise a processor and one or more sensors configured to collect data pertaining to an environment of a hybrid vehicle. The processor may be configured to analyze the data and, based on the data, determine one or more factors of the environment of the hybrid vehicle, and select one or more vehicle operation settings, based on the one or more factors of the environment.

According to an exemplary embodiment, the one or more vehicle operation settings may comprise one or more of the following: one or more vehicle operation modes; one or more walking gait modes; a vehicle speed; and a direction of travel.

According to an exemplary embodiment, the processor may be further configured to automatically control the hybrid vehicle, and cause the hybrid vehicle to execute the one or more vehicle operation settings.

According to an object of the present disclosure, a hybrid vehicle is provided. The hybrid vehicle may comprise a chassis and a plurality of leg-wheel components coupled to the chassis. The plurality of leg-wheel components may be configured to be collectively operable to provide wheeled locomotion and walking locomotion.

According to an exemplary embodiment, each of the plurality of leg-wheel components may comprise a leg component and a wheel component.

According to an exemplary embodiment, the wheel component may be coupled to the leg component.

According to an exemplary embodiment, the leg component may comprise a plurality of segments and one or more joints, and the plurality of segments may be configured to rotate about each other via the one or more joints.

According to an exemplary embodiment, each of the plurality of leg-wheel components may comprise a coupling component configured to couple the leg-wheel component to the chassis.

According to an exemplary embodiment, each of the plurality of leg-wheel components may comprise an in-wheel motor configured to power movement of one or more of the wheel component and the leg component.

According to an exemplary embodiment, each of the plurality of leg-wheel components may comprise a suspension system.

According to an exemplary embodiment, each of the leg-wheel components may be configured to move from a retracted state to an extended state, and movement from the retracted state to the extended state elevates the chassis.

According to an exemplary embodiment, each of the plurality of leg-wheel components may be configured to move differently from one or more other leg-wheel components of the plurality of leg-wheel components.

According to an exemplary embodiment, the hybrid vehicle may further comprise a payload compartment configured to receive and carry a payload.

According to an object of the present disclosure, a system for controlling a hybrid vehicle is provided. The system may comprise a hybrid vehicle, comprising a chassis and a plurality of leg-wheel components coupled to the chassis. The plurality of leg-wheel components may be configured to be collectively operable to provide wheeled locomotion and walking locomotion. The system may comprise a computing device, comprising a processor and a memory, configured to store programming instructions that, when executed by the processor, cause the processor to cause the plurality of leg-wheel components to collectively operate to provide wheeled locomotion and walking locomotion.

According to an exemplary embodiment, the hybrid vehicle may comprise one or more sensors configured to collect data pertaining to an environment of the hybrid vehicle. The programming instructions, when executed by the processor, may be further configured to cause the processor to analyze the data and, based on the data, determine one or more factors of the environment of the hybrid vehicle, and select one or more vehicle operation settings, based on the one or more factors of the environment.

According to an exemplary embodiment, the one or more vehicle operation settings may comprise one or more of the following: one or more vehicle operation modes; one or more walking gait modes; a vehicle speed; and a direction of travel.

According to an exemplary embodiment, the programming instructions, when executed by the processor, may be further configured to cause the processor to automatically control the hybrid vehicle, and cause the hybrid vehicle to execute the one or more vehicle operation settings.

According to an exemplary embodiment, each of the plurality of leg-wheel components may comprise a leg component and a wheel component.

According to an exemplary embodiment, the wheel component may be coupled to the leg component.

According to an exemplary embodiment, the leg component may comprise a plurality of segments and one or more joints, and the plurality of segments may be configured to rotate about each other via the one or more joints.

According to an exemplary embodiment, each of the plurality of leg-wheel components may comprise a coupling component configured to couple the leg-wheel component to the chassis.

According to an exemplary embodiment, each of the plurality of leg-wheel components may comprise an in-wheel motor configured to power movement of one or more of the wheel component and the leg component.

According to an exemplary embodiment, each of the plurality of leg-wheel components may comprise a suspension system.

According to an exemplary embodiment, each of the leg-wheel components may be configured to move from a retracted state to an extended state, movement from the retracted state to the extended state elevates the chassis, and the programming instructions, when executed by the processor, may be configured to cause each of the leg-wheel components to move from the retracted state to the extended state.

According to an exemplary embodiment, each of the plurality of leg-wheel components may be configured to move differently from one or more other leg-wheel components of the plurality of leg-wheel components.

According to an exemplary embodiment, the hybrid vehicle may further comprise a payload compartment configured to receive and carry a payload.

BRIEF DESCRIPTION OF THE DRAWINGS

The accompanying drawings, which are incorporated in and form a part of the Description of Embodiments, illustrate various non-limiting and non-exhaustive embodiments of the subject matter and, together with the Detailed Description, serve to explain principles of the subject matter discussed below. Unless specifically noted, the drawings referred to in this Brief Description of Drawings should be understood as not being drawn to scale and like reference numerals refer to like parts throughout the various figures unless otherwise specified.

DETAILED DESCRIPTION

Figure 1:
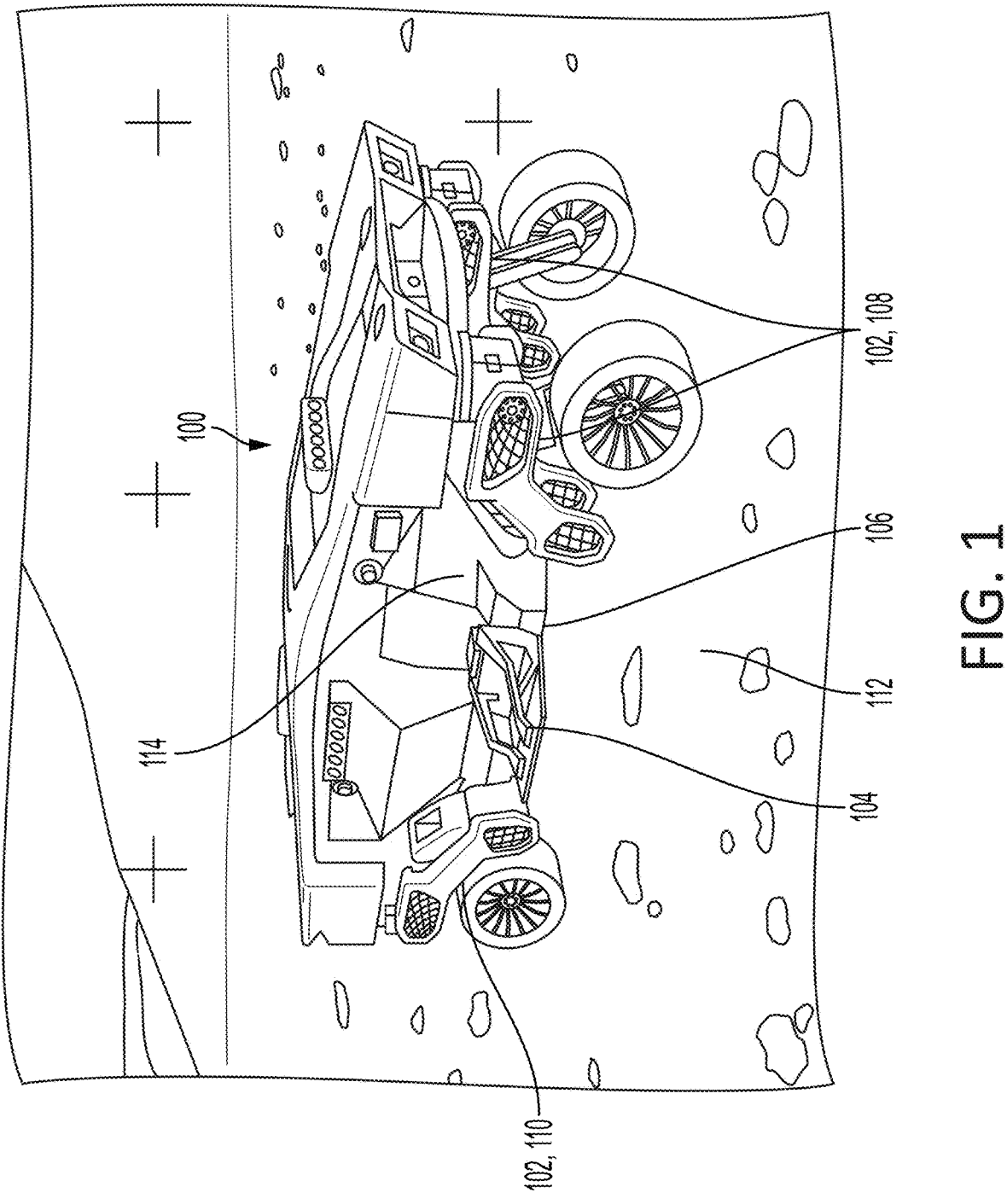
FIG. 1 illustrates a hybrid vehicle configured to perform omnidirectional movement using both walking motion and rolling motion, according to an exemplary embodiment of the present disclosure.

The following Detailed Description is merely provided by way of example and not of limitation. Furthermore, there is no intention to be bound by any expressed or implied theory presented in the preceding background or in the following Detailed Description.

Reference will now be made in detail to various exemplary embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications, and equivalents, which may be included within the spirit and scope of the various embodiments as defined by the appended claims. Furthermore, in this Detailed Description, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Some portions of the detailed descriptions which follow are presented in terms of procedures, logic blocks, processing, and other symbolic representations of operations on data within an electrical device. These descriptions and representations are the means used by those skilled in the data processing arts to most effectively convey the substance of their work to others skilled in the art. In the present application, a procedure, logic block, process, or the like, is conceived to be one or more self-consistent procedures or instructions leading to a desired result. The procedures are those requiring physical manipulations of physical quantities. Usually, although not necessarily, these quantities may take the form of electrical or magnetic signals capable of being stored, transferred, combined, compared, and otherwise manipulated in an electronic system, device, and/or component.

It should be borne in mind, however, that these and similar terms are to be associated with the appropriate physical quantities and are merely convenient labels applied to these quantities. Unless specifically stated otherwise as apparent from the following discussions, it is appreciated that throughout the description of embodiments, discussions utilizing terms such as "determining," "communicating," "taking," "comparing," "monitoring," "calibrating," "estimating," "initiating," "providing," "receiving," "controlling," "transmitting," "isolating," "generating," "aligning," "synchronizing," "identifying," "maintaining," "displaying," "switching," or the like, refer to the actions and processes of an electronic item such as: a processor, a sensor processing unit (SPU), a processor of a sensor processing unit, an application processor of an electronic device/system, or the like, or a combination thereof. The item manipulates and transforms data represented as physical (electronic and/or magnetic) quantities within the registers and memories into other data similarly represented as physical quantities within memories or registers or other such information storage, transmission, processing, or display components.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, logic, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example device vibration sensing system and/or electronic device described herein may include components other than those shown, including well-known components.

Various techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, perform one or more of the methods described herein. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

Various embodiments described herein may be executed by one or more processors, such as one or more motion processing units (MPUs), sensor processing units (SPUs), host processor(s) or core(s) thereof, digital signal processors (DSPs), general purpose microprocessors, application specific integrated circuits (ASICs), application specific instruction set processors (ASIPs), field programmable gate arrays (FPGAs), a programmable logic controller (PLC), a complex programmable logic device (CPLD), a discrete gate or transistor logic, discrete hardware components, or any combination thereof designed to perform the functions described herein, or other equivalent integrated or discrete logic circuitry. The term "processor," as used herein may refer to any of the foregoing structures or any other structure suitable for implementation of the techniques described herein. As employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Moreover, processors can exploit nano-scale architectures such as, but not limited to, molecular and quantum-dot based transistors, switches and gates, in order to optimize space usage or enhance performance of user equipment. A processor may also be implemented as a combination of computing processing units.

In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any processor, controller, microcontroller, or state machine. A processor may also be implemented as a combination of computing devices, e.g., a combination of an SPU/MPU and a microprocessor, a plurality of microprocessors, one or more microprocessors in conjunction with an SPU core, MPU core, or any other such configuration. One or more components of an SPU or electronic device described herein may be embodied in the form of one or more of a "chip," a "package," an Integrated Circuit (IC).

According to an exemplary embodiment, a vehicle capable of both wheeled locomotion (e.g., rolling traction) and walking locomotion (e.g., walking motion) is provided and referred to herein as a "hybrid vehicle," in accordance with exemplary embodiments of the present disclosure. According to an exemplary embodiment, the hybrid vehicle may be configured for use in lunar exploration and/or construction.

Embodiments described herein provide the hybrid vehicle capable of walking locomotion that can be used during lunar exploration. It should be appreciated that the described embodiments may also be used in the exploration of other objects on earth and in space, such as terrestrial planets, moons, asteroids, comets, etc. The described hybrid vehicle may be used for scientific exploration of explored and/or unexplored regions on the moon, resource exploration and mapping, mining, lunar construction, and/or astronaut assistance, among other suitable uses. For instance, in accordance with exemplary embodiments, the hybrid vehicle may comprise one or more leg-wheel components. Each leg-wheel component may be configured to perform movement with at least two degrees of freedom. In an exemplary embodiment, each of the leg-wheel components may be configured to perform movement with at least six degrees of freedom for providing walking gait and movement characteristics mimicking top climbing species and efficient walking species, such as, e.g., strong traction on steep mountain slopes.

According to some exemplary embodiments, the hybrid vehicle may comprise an autonomous control system configured to enable the hybrid vehicle to navigate extreme terrain using deep reinforcement learning (DRL) to select vehicle operation modes (e.g., a walking vehicle operation mode, a wheeled locomotion vehicle operation mode, etc.), as well as walking gait selection, vehicle speed, direction of travel, etc., without requiring human operator input. Furthermore, the hybrid vehicle may comprise a cargo system configured to enable the hybrid vehicle to transport and/or deliver one or more objects such as, e.g., relatively heavy materials/payloads, making the hybrid vehicle well suited for transporting materials and payloads on the lunar surface.

Referring now to FIG. 1, a hybrid vehicle 100 capable of, and configured to perform, omnidirectional movement using both walking motion and rolling motion, is illustratively depicted, in accordance with an exemplary embodiment of the present disclosure, also referred to herein as an ultimate mobility vehicle (UMV).

According to an exemplary embodiment, the hybrid vehicle 100 may comprise four leg-wheel components 102. It is noted, however, that other numbers of leg-wheel components 102 may be incorporated, while maintaining the spirit and functionality of the present disclosure. According to an exemplary embodiment, each of the leg-wheel components 102 may be configured to perform movement with at least two degrees of freedom. As illustrated, the hybrid vehicle 100 may comprise a payload compartment 104 configured to receive and carry a payload. It should be appreciated that the hybrid vehicle 100, in some exemplary embodiments, may be configured to be operated by an onboard operator, may be configured to be operated remotely, and/or may be configured to be operated autonomously.

In an exemplary embodiment, the leg-wheel components 102 may be configured to perform movement with at least six degrees of freedom. It should be appreciated that, while the leg-wheel components 102 may be configured to be controlled collectively to provide rolling and/or walking locomotion, each leg-wheel component 102 may be capable of different movement or positioning, from the one or more other leg-wheel components 102, during operation. For example, while using wheeled locomotion on an upward slope, in order to maintain a body 114 and a chassis 106 of the hybrid vehicle 100 level with flat ground, the front leg-wheel components 108 may be retracted and the rear leg-wheel components 110 be extended. In an exemplary embodiment, while using walking locomotion to traverse rough terrain, each leg-wheel component 102, or opposite pairs of the leg-wheel components 102 (e.g., front left and rear right), may be configured to move differently from the other leg-wheel components 102. The leg-wheel components 102 may be configured to operate to move the hybrid vehicle 100 in any direction of travel, and may be configured to change direction(s) at any time.

Figures 2A, 2B:
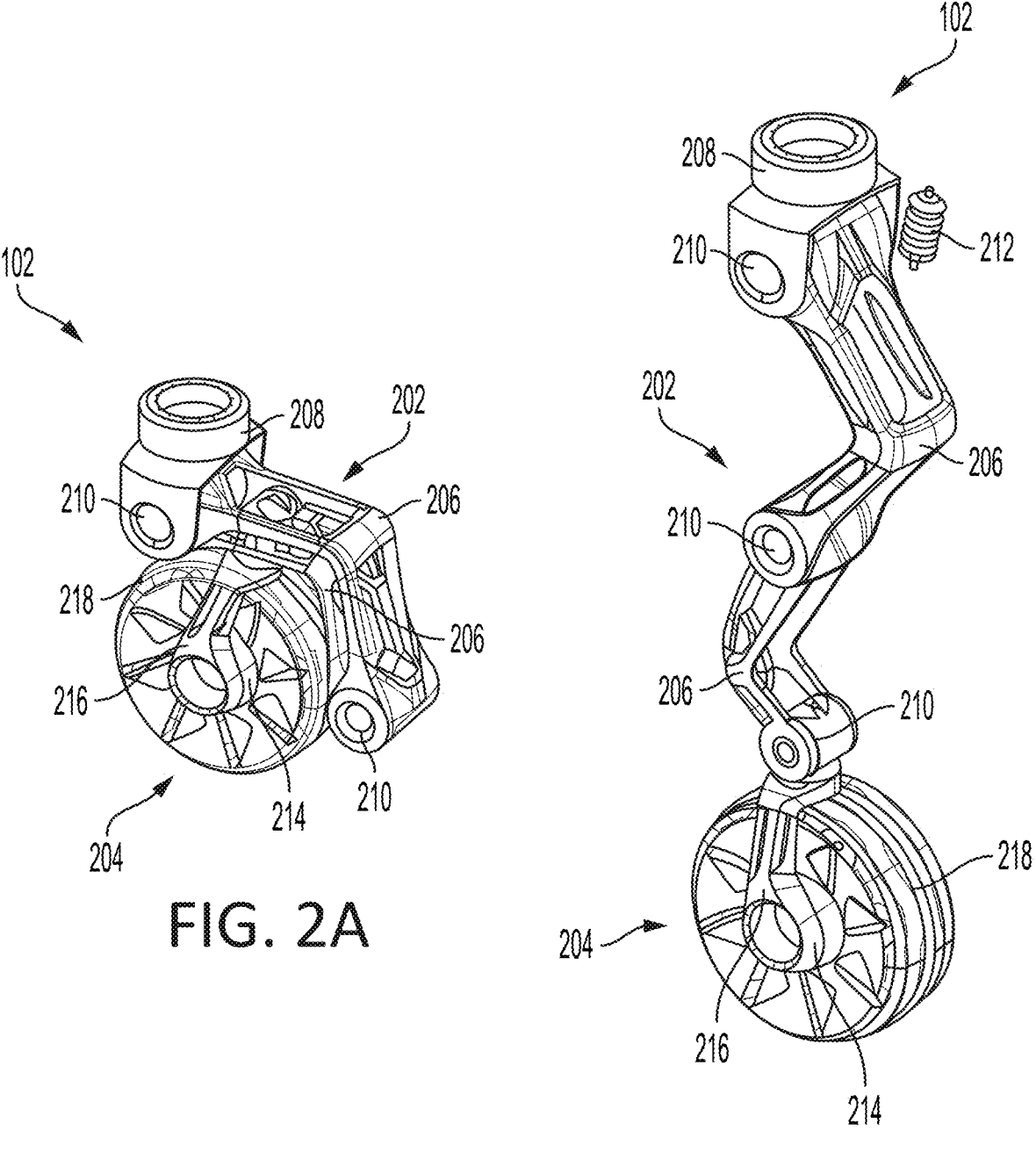
FIGS. 2A and 2B illustrate a leg-wheel component in retracted and extended positions, according to an exemplary embodiment of the present disclosure.
Figure 2C:
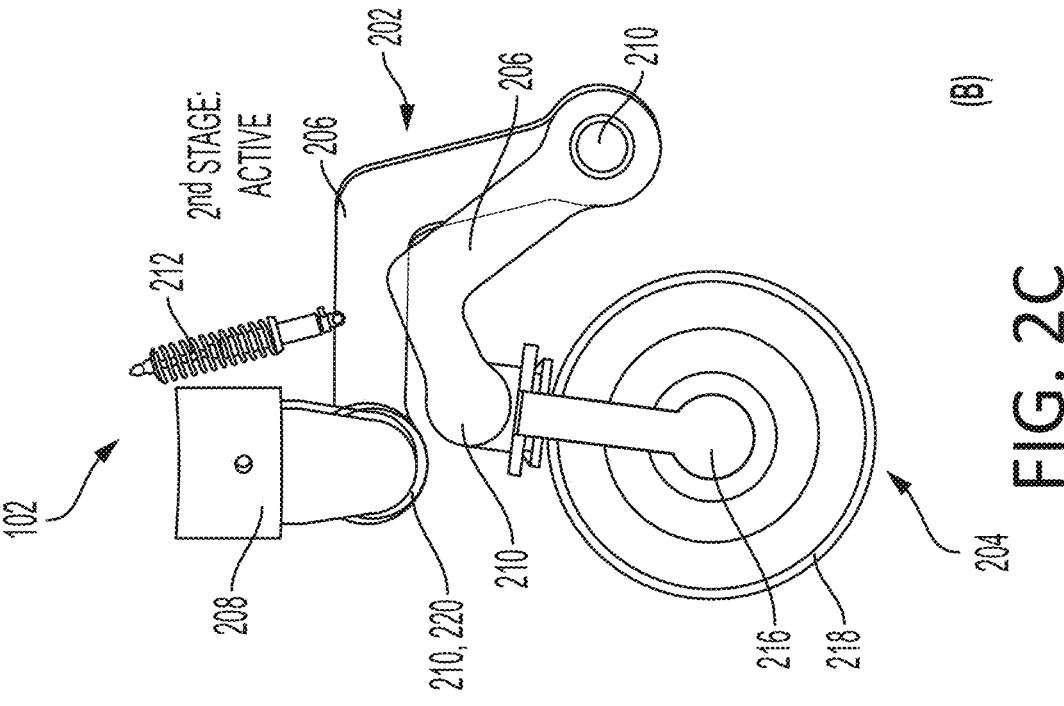
FIG. 2C is a diagram illustrating a low range of motion suspension stage and the high range of motion suspension stage, according to an exemplary embodiment of the present disclosure.
Figure 2C:
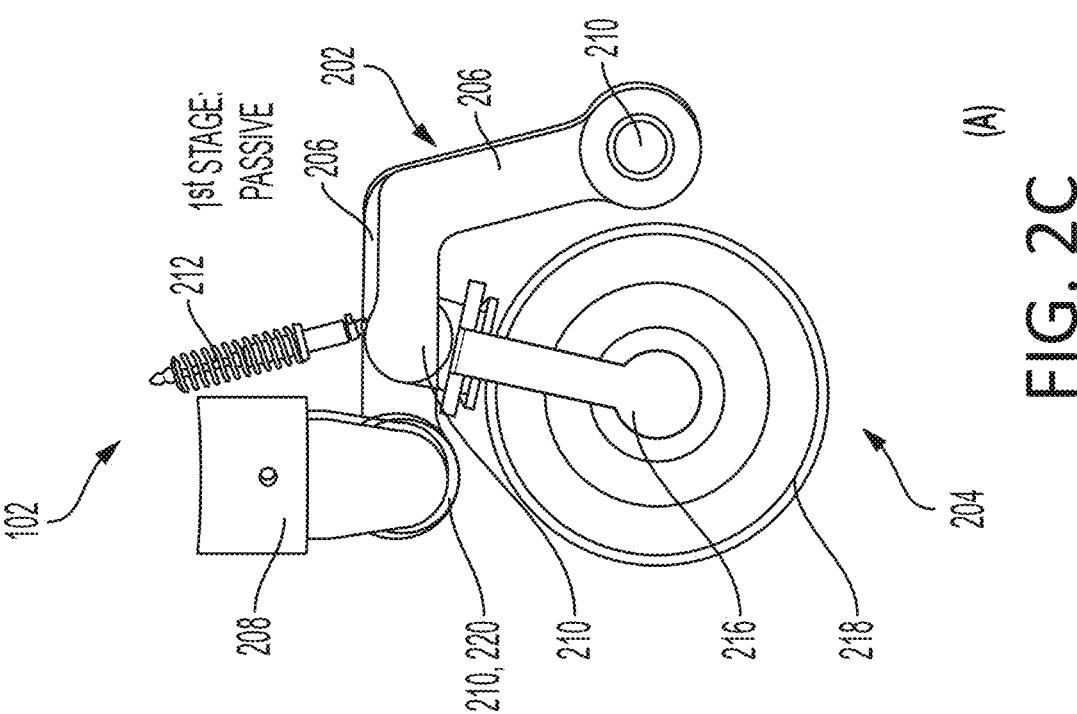

According to some exemplary embodiments, the hybrid vehicle 100 may be configured to utilize an adaptive, high range of motion suspension (AHROMS) and/or a whole-vehicle motion control system. When the terrain 112 causes the hybrid vehicle 100 to become stuck and/or block a wheel (e.g., wheel component 204, as shown in FIGS. 2A-2C) from moving forward, the AHROMS system may be configured to lift and move the wheel to a place with better traction and/or it can function as a high-travel suspension system to aid in overcoming obstacles. And when needed, the AHROMS may be capable of providing quasi-static walking.

Various aspects of control for the hybrid vehicle 100 may be controlled by either an operator (e.g., a remote operator) and/or the hybrid vehicle 100 itself, depending on the operation mode. In general, aspects of the operation may be subject to different types of operator control. For example, aspects that may be controlled in operating the hybrid vehicle 100 may comprise one or more objectives of the hybrid vehicle 100, one or more destinations of the hybrid vehicle 100, a speed and direction of travel, a type of locomotion used (e.g., the wheeled, the walking, or a combination), a position of one or more leg-wheel components 102 when in the walking locomotion, controlling the walking gait when in the walking locomotion, etc. Moreover, in controlling the operation of the hybrid vehicle 100, different vehicle operation modes are described that may afford different types of operation to the hybrid vehicle 100 operator. In general, the vehicle operation modes may be configured to cover modes in which an onboard operator is in complete control of the vehicle operation to modes in which the operator (onboard or remote) is in complete control of the vehicle operation to modes in which a remote operator may provide the hybrid vehicle 100 with objectives that the hybrid vehicle 100 may interpret, which the hybrid vehicle 100 may then implement to accomplish the objectives.

Referring now to FIGS. 2A and 2B, an example leg-wheel component 102 in a retracted position (FIG. 2A) and an extended position (FIG. 2B), are illustratively depicted, in accordance with an exemplary embodiment of the present disclosure.

Various embodiments of such leg-wheel components 102 are described in co-pending U.S. patent application Ser. No. 16/734,310 (U.S. Patent Application Publication No. 2020/0216127). It is noted that other configurations of one or more leg-wheel components 102 may be incorporated into the present disclosure, while maintaining the spirit and functionality of the present disclosure.

The leg-wheel component 102 may comprise a leg component 202 and the wheel component 204. The wheel component 204 may be coupled to the leg component 202.

According to an exemplary embodiment, the leg-wheel component 102 may comprise a coupling component 208 configured to couple the leg-wheel component 102 to the body 114, a frame, the chassis 106, and/or other suitable component of the hybrid vehicle 100.

The leg component 202 may be divided into one or more segments 206. The one or more segments 206, the coupling component 208, and/or the wheel component 204 may be configured to rotate about each other via one or more movable joint components 210. According to an exemplary embodiment, the leg-wheel component 102 may comprise one or more suspension systems 212 (e.g., springs, shock absorbers, etc).

According to an exemplary embodiment, the wheel component 204 may be configured to rotate along an axis while coupled to the leg component 202, enabling the hybrid vehicle 100 to move along a surface in contact with the wheel component 204. According to an exemplary embodiment, the leg-wheel component 102 may comprise one or more braking mechanisms for preventing and/or decreasing rotation of the wheel component 204.

With reference to FIG. 2A, the leg-wheel component 102 (also referred to as a hybrid vehicle traversal component) is in the retracted state, with the leg-wheel component 102 being configured and positioned to provide the wheeled locomotion. With reference to FIG. 26, the leg-wheel component 102 is in the extended state, with the leg-wheel component 102 being configured and positioned to provide the walking locomotion and/or the wheeled locomotion.

According to an exemplary embodiment, the wheeled locomotion may be available for use in situations where traditional vehicle travel using the rolling wheels 204 is available (e.g., flat lunar surfaces). The wheeled locomotion is efficient, when available, for conveyance of the vehicle (e.g., hybrid vehicles 100, 300, 500, 600) between destinations. According to some exemplary embodiments, the leg-wheel components 102 may be configured to allow for active height adjustment of the hybrid vehicle 100, as surface ruggedness varies, while still being capable of wheeled traversal.

In the walking locomotion, the hybrid vehicle 100 may be configured to walk up elevations and the terrain that is not surmountable using the wheeled locomotion. In some instances, the walking locomotion allows for nimble and quiet motion, relative to the wheeled locomotion. The hybrid vehicle 100 may also be configured to move laterally, allowing for quadrupedal ambulation.

According to an exemplary embodiment, the leg-wheel component 102 may comprise one or more in-wheel motors 214 configured to power movement of the wheel component 204 and/or the leg component 202. The use of the in-wheel motors 214 frees the suspension 212 from traditional axles and allows for ambulation, but also increases the driving performance and adaptability.

By using the wheels 204 as feet, the electric motors 214 may be configured to lock for stable ambulation, but also may have slow torque controlled rotation for micro movements when climbing or during self-recovery. According to some exemplary embodiments, the wheel component 204 of the leg-wheel component 102 may be configured to rotate 180 degrees perpendicular to a hub 216, not only allowing leaning capability while driving, but also giving the wheel components 204 enhanced positioning potential when a tire 218 is locked and in a walking mode. The wheel component 204 may be configured to turn 90 degrees and even may be configured to be used as a wide foot pad, lowering the hybrid vehicle's 100 pounds per square inch (PSI) footprint when walking over loose materials or fragile surfaces, similar to that of a snowshoe.

Referring now to FIG. 2C, a diagram indicating a low range of motion suspension stage ((A), a passive stage), and a high range of motion suspension stage ((B), an active stage) of the leg-wheel component 102 is illustratively depicted, in accordance with an exemplary embodiment of the present disclosure.

According to an exemplary embodiment, the leg-wheel component 102 may be configured to provide two stage suspension: a first, low range of motion suspension stage, when the leg-wheel component 102 of the hybrid vehicle 100 is in the retracted position (A), and a second, high range of motion suspension stage, when the leg-wheel component 102 of the hybrid vehicle 100 is in the extended position (B).

According to an exemplary embodiment, in the low range of motion suspension stage, the suspension system 212 (e.g., a coil-over suspension) may be utilized and engaged when the leg-wheel component 102 is in the retracted position. According to an exemplary embodiment, while in the low range of motion suspension stage, a knee joint component 220 of the leg-wheel component 102 may be relaxed, while the remaining joints 210 of the leg-wheel component 102 may be locked. During the low range of motion suspension stage, the leg-wheel component 102 may be configured to handle high-frequency vibrations through the chassis mounted suspension system 212. According to an exemplary embodiment, when the leg-wheel component 102 is retracted and the low range of motion suspension stage is enabled, the hybrid vehicle 100 may be configured to provides 0 to 5 inches of suspension during the wheeled locomotion. It is noted, however, that other amounts of suspension may be incorporated while maintaining the spirit and functionality of the present disclosure.

According to an exemplary embodiment, in the high range of motion suspension stage, the suspension system 212 (e.g., the coil-over suspension) may be disengaged when the leg-wheel component 102 is in the extended or actuated position. For example, the suspension system 212 may be configured to remain with the body 114 and the chassis 106 during the high range of motion suspension stage, and the knee joint 220 may be driven by a motor in order to provide suspension. According to an exemplary embodiment, during the high range of motion suspension stage, the leg-wheel component 102 may be configured to support advanced driving dynamics through the capabilities of the motor at the knee joint 220. According to an exemplary embodiment, when the leg-wheel component 102 is extended and the high range of motion suspension stage is enabled, the hybrid vehicle 100 may be configured to provide 5 to 50 inches of suspension during the walking locomotion. It is noted, however, that other amounts of suspension may be incorporated while maintaining the spirit and functionality of the present disclosure.

Figure 3A:
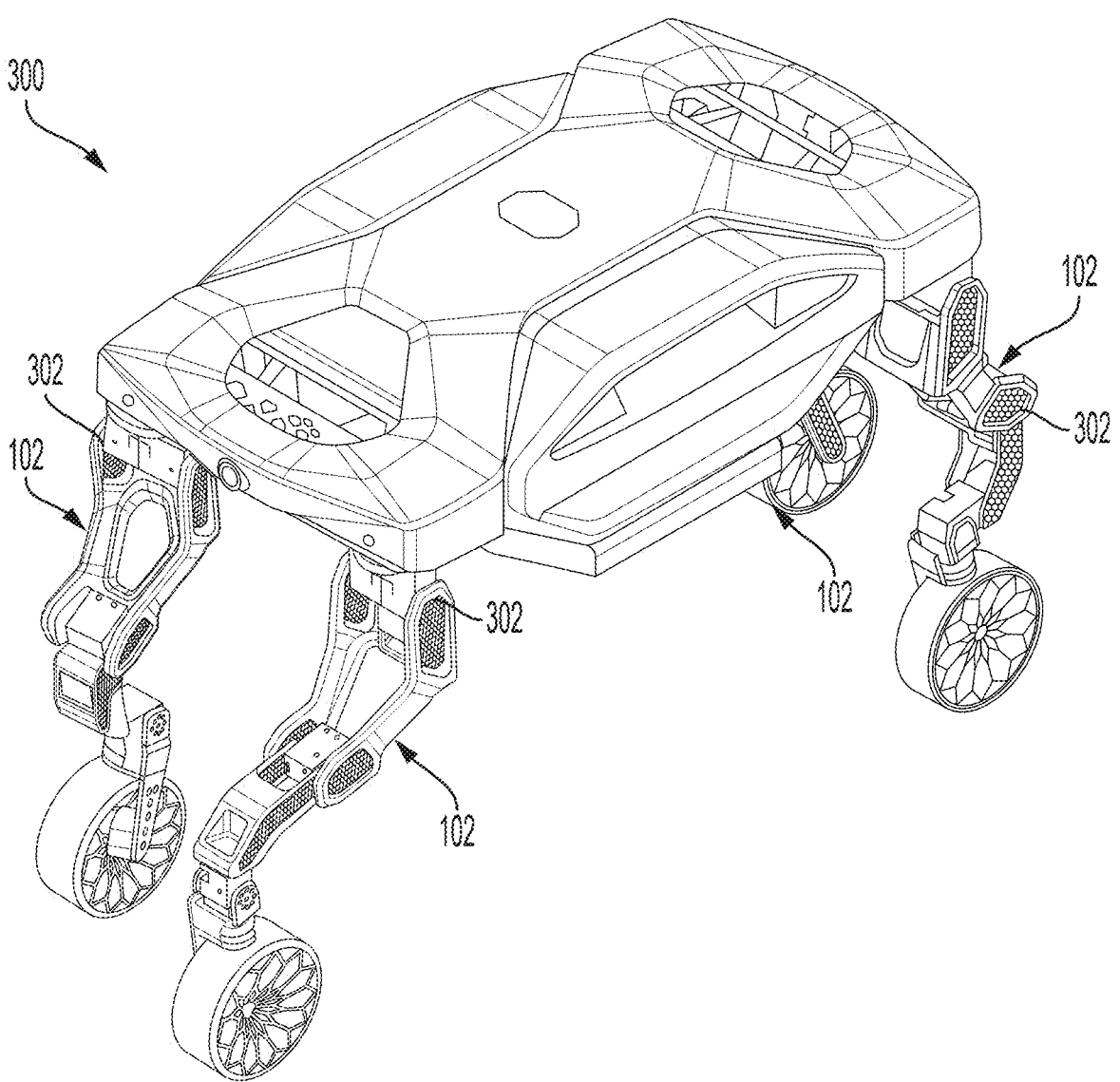
FIGS. 3A through 3C illustrate perspective views of different walking gaits of a hybrid vehicle, according to exemplary embodiments of the present disclosure.
Figure 3B:
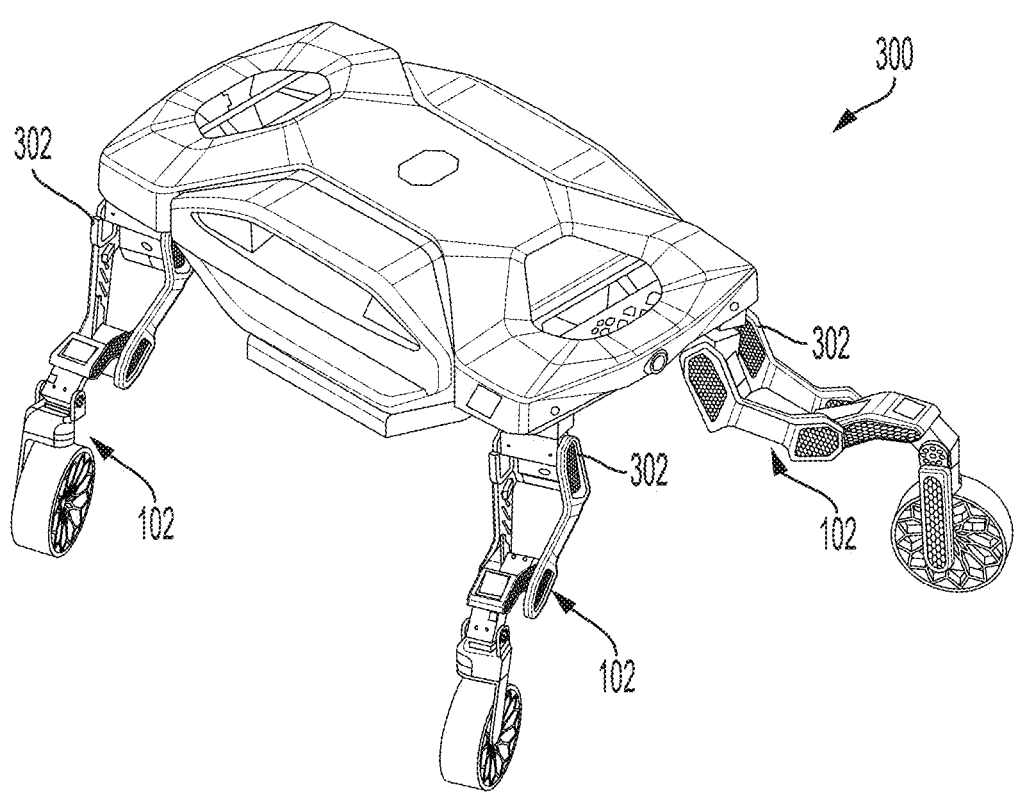
Figure 3C:
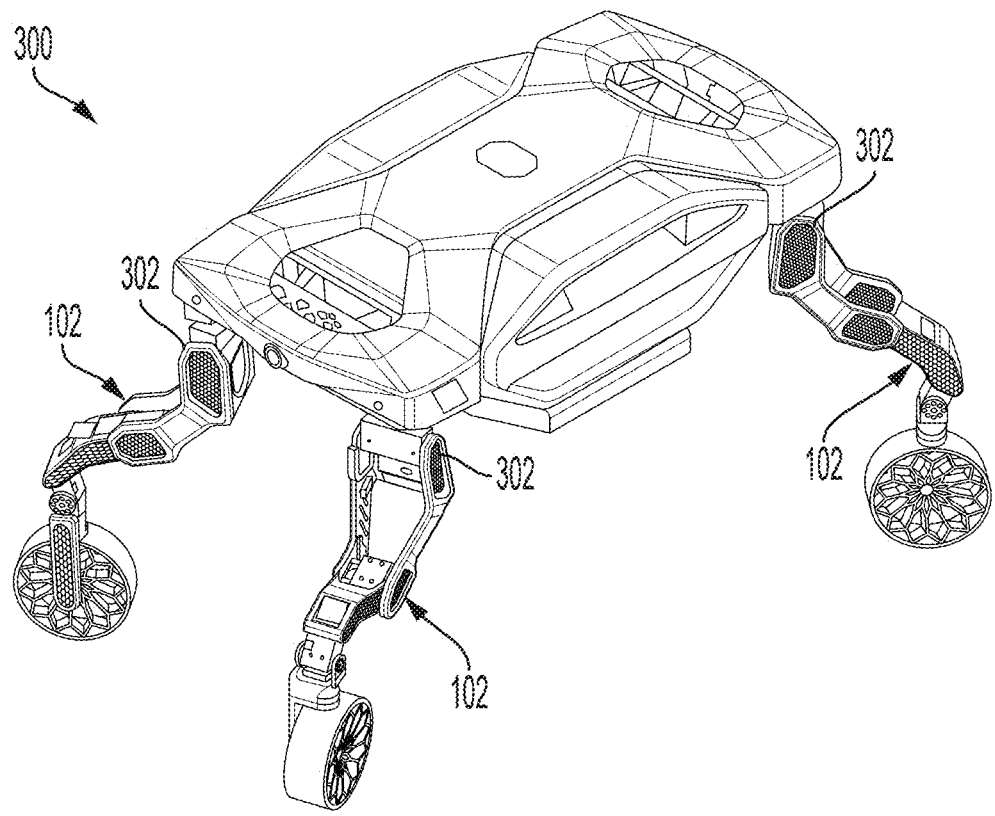

Referring now to FIGS. 3A through 3C, perspective views of different walking gaits of a hybrid vehicle 300 are illustratively depicted, in accordance with exemplary embodiments of the present disclosure.

FIG. 3A illustrates an example view of the hybrid vehicle 300 operating in a mammalian walking gait, according to an exemplary embodiment of the present disclosure. According to an exemplary embodiment, while in the mammalian walking gait, the leg-wheel components 102 may be positioned in a support position below a hip section 302, allowing more of the reaction force to translate axially through each link rather than in shear load. In this position, each leg-wheel component 102 may function closer to a singularity, meaning that, for a given change in a joint angle, an end effector will move relatively little. This results in a relatively energy efficient gait which is well suited for moderate terrain over longer periods of time, but may not be as stable because of the narrower stance of the hybrid vehicle 300.

FIG. 3B illustrates an example view of the hybrid vehicle 300 operating in a reptilian walking gait, according to an exemplary embodiment of the present disclosure. According to an exemplary embodiment, the reptilian walking gait may be configured to generally mirror how animals such as a lizard or gecko might traverse terrain. In this position, the reptilian walking gait may rely more heavily on one or more hip abduction motors which may be configured to swing the leg-wheel components 102 around a vertical axis, maintaining a wider stance. The reptilian gait position results in a higher level of stability and control over movement, but is less energy efficient. The wide stance results in high static loads on each motor, making the reptilian gait best suited for walking across extremely unpredictable, rugged terrain for short periods of time.

FIG. 3C illustrates an example view of the hybrid vehicle 300 operating in a hybrid walking gait, according to an exemplary embodiment of the present disclosure. In addition to the reptilian and mammalian gaits, a variety of variants combining the strategies are possible. These variants may be generated through optimization techniques and/or discovered through simulation and machine learning. These hybrid gaits allow the hybrid vehicle 300 to optimize around the strengths and weaknesses of the more static bio-inspired gaits, transitioning to a more mammalian-style gait when the terrain is gentler and to a more reptilian-style gait in extremely rugged and/or dynamic environments. In dynamic and highly variable terrains, the hybrid vehicle 300 may be configured to constantly adjust its gait based on the environment, battery charge, and/or any number of other factors.

In accordance with the described embodiments, the wheeled locomotion may be available for use in situations where traditional vehicle travel using the rolling wheels is available (e.g., relatively flat terrain). The wheeled locomotion is efficient, when available, for conveyance of the hybrid vehicle (e.g., hybrid vehicles 100, 300, 500, 600) between destinations. In some exemplary embodiments, the leg-wheel components 102 may be configured to allow for active height adjustment of the hybrid vehicle when transitioning from flat terrain to more rugged terrain.

In the walking locomotion, the hybrid vehicle may be configured to walk up elevations and terrain that may not be surmountable using the wheeled locomotion. In some instances, the walking locomotion may allow for nimble and quiet motion, relative to the wheeled locomotion. The hybrid vehicle may also be capable of moving laterally, allowing for quadrupedal ambulation.

Figure 4:
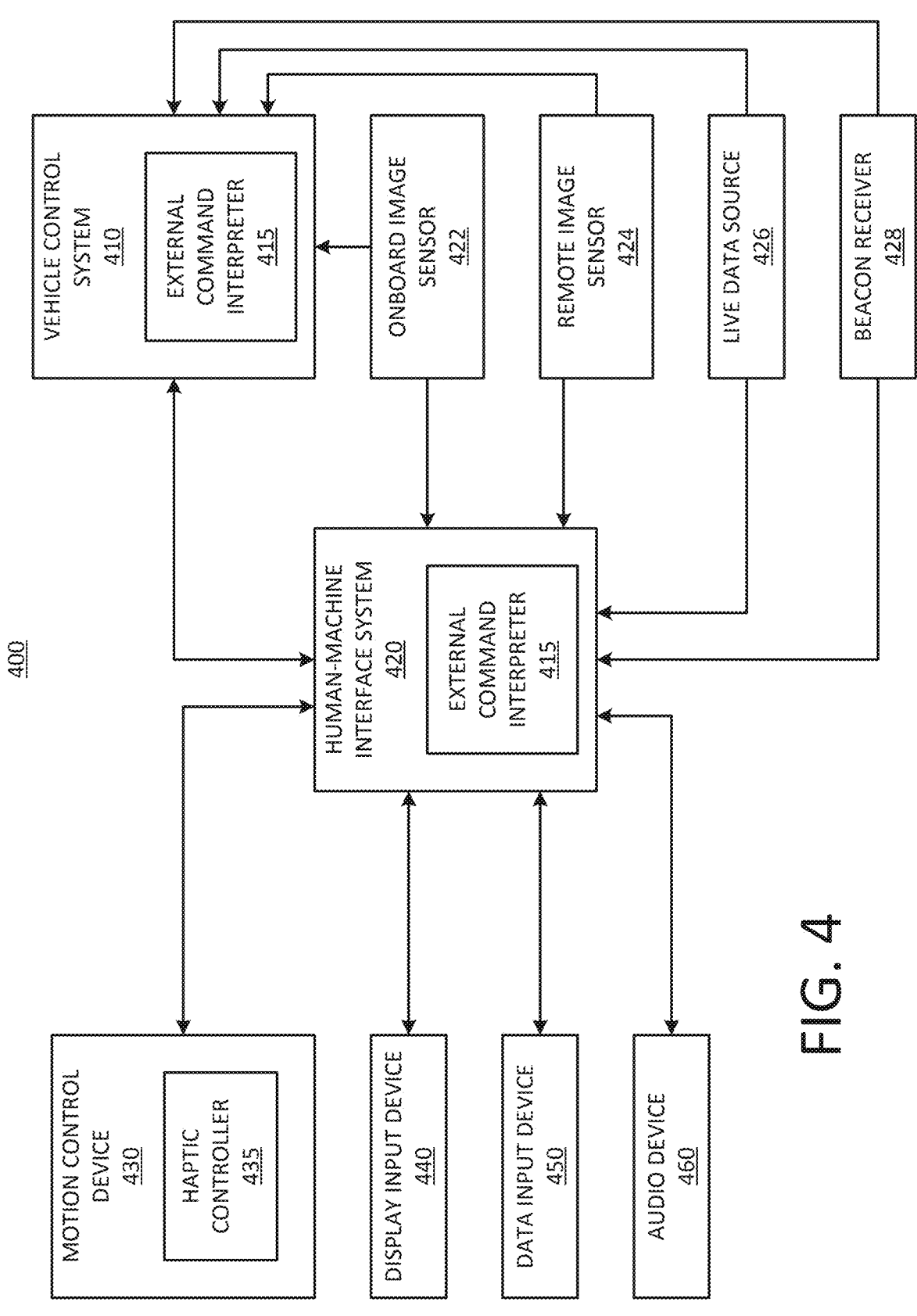
FIG. 4 is a block diagram of a system for providing supplementary control modes for control of a hybrid vehicle, according to exemplary embodiments of the present disclosure.

Referring now to FIG. 4, a block diagram of a system 400 for providing a stability indication of the hybrid vehicle (e.g., hybrid vehicles 100, 300, 500, 600) is illustratively depicted, in accordance with an exemplary embodiment of the present disclosure. FIG. 4 illustrates one example of the system 400 that can be used in accordance with or to implement various embodiments which are discussed herein.

In controlling the operation of the hybrid vehicle described herein, a number of aspects of the operation are subject to different types of operator control. For example, aspects that may be controlled in operating the hybrid vehicle may comprise the objectives of the hybrid vehicle, the destination of the hybrid vehicle, the speed and direction of travel of the hybrid vehicle, the type of locomotion used (e.g., wheeled, walking, or a combination), the position of legs when in the walking locomotion, controlling the walking gait when in the walking locomotion, etc. Embodiments described herein may configured to provide supplementary control modes for control of the hybrid vehicle.

According to an exemplary embodiment, the system 400 may comprise a vehicle control system 410 and a human-machine interface (HMI) system 420. The vehicle control system 410 may be configured to control movement and motion of the hybrid vehicle responsive to one or more received inputs. It should be appreciated that the one or more received inputs may comprise, without limitation, commands received from the human operator, either onboard the hybrid vehicle or remote, from an autonomous control system, and/or a combination thereof. It should be further appreciated that vehicle control system 400 may comprise multiple controllers and/or control modules, and that the functionality of each controller and/or control module may be arranged within one or more different combinations of controllers, resulting in movement of the hybrid vehicle.

The vehicle control system 410 may be configured to receive commands for movement and control of the hybrid vehicle. These commands may comprise, without limitation, the mission objectives, the vehicle destination, the speed and direction of travel, the locomotion mode (e.g., wheeled, walking, or a combination), motor positions of the wheel-leg components, etc. The leg-wheel components 102 may comprise different walking modes. In addition to the walking locomotion and the rolling locomotion, the wheel motors 214 may be configured to be used while walking in order to create a hybrid wheeled-walking mode of locomotion. Under the rolling locomotion, the leg-wheel components 102 may be configured to operate as the high range of motion suspension. It should be appreciated that vehicle control system 410 may be configured to receive commands from the human operator and/or non-human input, such as another hybrid vehicle.

The HMI system 420 may be configured to receive commands from the human operator, either onboard or remote, for controlling the hybrid vehicle via the vehicle control system 410. The HMI system 420 may be configured to receive and present information from the vehicle control system 410 for informing the operator of various information regarding the control and operation of the hybrid vehicle.

The HMI system 420 may be configured to receive commands from various input/output devices, such as, e.g., a motion control device 430, a display device 440, a data input device 450, and/or an audio device 460. The motion control device 430 may comprise, e.g., a steering wheel or a joystick for receiving motion commands from the operator for controlling movement and operation of the hybrid vehicle. It should be appreciated that the motion commands may comprise commands to move to a particular destination, use a particular locomotion mode, move at a certain speed, etc. According to an exemplary embodiment, the motion control device 430 may comprise a haptic controller 435 configured to provide haptic feedback to the operator.

Referring still to FIG. 4, the display device 440 of FIG. 4 may comprise a liquid crystal device (LCD), a light emitting diode display (LED) device, a plasma display device, a touch screen device, and/or other suitable display device suitable for creating graphic images and alphanumeric characters recognizable to a user.

The data input device 450 may comprise a touch device and/or a touch interface for receiving inputs of the human operator. According to an exemplary embodiment, the system 400 may comprise a plurality of data input devices 450 which may be located on one or more external surfaces of the hybrid vehicle. For example, the hybrid vehicle may comprise touch interfaces on each leg-wheel component 102, each portion of each leg-wheel component 102, the chassis, and/or any combination thereof. Touch control may be specific to a particular leg-wheel component 102, and/or may instantiate a central touch control (such as, e.g., for very small or very large vehicles). It should be appreciated that additional information may be conveyed through the touch interface using taps, swipes and/or other known gestures (e.g., for security, actuation, selection, fine control, etc.). Moreover, the touch interfaces may comprise one or more display devices (e.g., a touch screen) capable of displaying information, and/or may be touch only interfaces without an integrated display device.

According to some exemplary embodiments, the data input device 450 may be configured to allow for the explicit control of a visible symbol (e.g., a cursor) on the display device 440 and may be configured to indicate user selections of selectable items displayed on the display device 440. Many implementations of the data input device 450 are known in the art including, e.g., a trackball, a mouse, a touch pad, a touch screen, a joystick, and/or special keys on an alphanumeric input device capable of signaling movement of a given direction or manner of displacement. Alternatively, it will be appreciated that the cursor may be directed and/or activated via input from the alphanumeric input device using special keys and key sequence commands. According to an exemplary embodiment, the data input device 450 and the display device 440 may be configured to operate cooperatively as the touch screen device.

The audio device 460 may be configured to allows for an audio presentation of information to the operator. According to some exemplary embodiments, the audio device 460 may comprise a speaker. According to some exemplary embodiments, the audio device 460 may comprise a microphone configured for receiving, e.g., voice commands from the user.

According to an exemplary embodiment, the motion control device 430, the display device 440, the data input device 450, and/or the audio device 460, and/or any combination thereof (e.g., user interface selection devices), may be configured to collectively operate to provide a graphical user interface (GUI) under the direction of a processor. The GUI may be configured to enable the user to interact with the system 400 through one or more graphical representations presented on the display device 440 by interacting with one or more of the motion control device 430, the display device 440, the data input device 450, and/or the audio device 460.

According to an exemplary embodiment, the HMI system 420 may comprise an external command interpreter 415 configured for interpreting one or more commands received during a supplementary control mode, such as, e.g., a sign mode, a follow mode, or a touch mode. According to an exemplary embodiment, in the sign mode, the operator external to the hybrid vehicle may control operation of the hybrid vehicle by issuing one or more commands using, e.g., sign language. According to an exemplary embodiment, in the follow mode, one or more hybrid vehicles (e.g., one or more subservient hybrid vehicles) may be configured to follow a lead hybrid vehicle which may be configured to control operations of the one or more subservient hybrid vehicles. According to an exemplary embodiment, in the touch mode, the hybrid vehicle may be configured to be controlled through one or more touch interfaces on an exterior of the hybrid vehicle.

According to an exemplary embodiment, the system 400 may comprise an onboard image sensor 422, a remote image sensor 424, a live data source 426, and/or a beacon receiver 428. The onboard image sensor 422 may be located on the hybrid vehicle, and may be configured to capture a first person point of view (POV) (1P-POV) image. The remote image sensor 424 may be located on a second vehicle (e.g., an aerial vehicle) and may be configured to capture a second person POV (2P-POV) image. The remote image sensor 424 may be configured to be capable of viewing the hybrid vehicle and an environment in which the hybrid vehicle is operating.

According to an exemplary embodiment, the image sensors may comprise one or more visual cameras. It should be appreciated that other types of imaging sensors may be used based on the context (e.g., infrared, radar, sonar, ultrasonic, etc.). Furthermore, it should be appreciated that each hybrid vehicle can may comprise more than one sensor. For instance, the hybrid vehicle may comprise a front image sensor and a rear image sensor configured for capturing front image data and rear image data, respectively.

According to an exemplary embodiment, live data may be received from at least one live data source 426. The live data source 426 may comprise real time data and/or near real time data that may further characterize at least one of one or more perspectives and may be at least partially generated external to the hybrid vehicle. For a roadway context, the live data may comprise traffic data that may be superimposed to more static map data of different perspective views. For a firefighting context, the live data may comprise data on fire spread and/or containment along with weather data superimposed across the perspectives. In a low visibility environment (e.g., a snowstorm), the live data may combine lower quality live images with recorded images during better conditions that are registered by one or more location sensors (e.g., GPS) and map orientation. It should be appreciated that many other types of data source are possible.

The beacon receiver 428 may be configured to receive control information from another hybrid vehicle, in which the other hybrid vehicle is instantiating a follow mode in which one or more subservient hybrid vehicles follow the lead vehicle which controls operations of the subservient hybrid vehicles.

The external command interpreter 415 may be configured to interpret one or more commands received during the supplementary control mode, such as, e.g., the sign mode, the follow mode, and/or the touch mode. It should be appreciated that the external command interpreter 415 may be included within one or both of the vehicle control system 410 (e.g., for receiving non-human generated commands) and the HMI interface 420 (e.g., for interpreting human operator provided commands).

For instance, during the sign mode, at least one of the onboard image sensor 422 and the remote image sensor 424 may be configured to capture sign language expressed through manual articulations of the human operator. The sign language may be received at the external command interpreter 415 which may be configured to interpret the sign language to form one or more commands. The sign mode may not require an external device to be used, and may allow for control of the hybrid vehicle without any electronic or data connection to the hybrid vehicle. For example, such control may be useful due to a high noise environment (e.g., firefighting) or a low noise environment (e.g., a military stealth mission) in which the hybrid vehicle may be used. It should be appreciated that the sign language used may be universal, such as, e.g., American Sign Language (ASL), specific to a situation, and/or coded for additional security (e.g., signs used by players and managers in sports).

According to an exemplary embodiment, during the follow mode, the lead vehicle may be configured to control operations of one or more subservient hybrid vehicles. The follow mode may be engaged by using the beacon carried on the lead vehicle (e.g., an electronic beacon device or other communication device) with commands being received at the beacon receiver 428. According to an exemplary embodiment, the follow mode may be engaged using sign language, as described in the sign mode, and captured by at least one of the onboard image sensor 422 and the remote image sensor 424. According to an exemplary embodiment, the follow mode may be instantiated by the lead vehicle using a paint and/or equivalent material configured to create a path or other instruction that is imaged by at least one of the onboard image sensor 422 and the remote image sensor 424 of the subservient vehicle and may be interpreted using the external command interpreter 415 in order to identify one or more commands of the deposited material. Such deposited material may be temporary or permanent, and may be of a visible material and/or an invisible material (to the human eye) and may be configured to utilize a special image sensor or filter in order to be captured (e.g., ultraviolet paint). The one or more commands identified by the deposited material may be active for a period of time different from a period of visibility of the deposited material. According to an exemplary embodiment, the lead vehicle may be configured to use the follow mode by issuing one or more commands using one or more ambulatory limbs (e.g., leg-wheel components 102) of the lead vehicle. For example, the subservient vehicle that is controlled by the follow mode may be configured to perform preparatory work by, e.g., carrying gear and equipment for a team on a mission.

According to an exemplary embodiment, during the touch mode, the hybrid vehicle may be configured to be controlled through one or more touch interfaces (e.g., the one or more data input devices 450) on the exterior of the hybrid vehicle. In such an exemplary embodiment, the operator of the hybrid vehicle may touch the one or more touch interfaces on the hybrid vehicle in order to pick-and-place its leg-wheel components 102 and/or perform one or more other control functions. It should be appreciated that the hybrid vehicle may comprise one or more touch interfaces on each leg-wheel component 102, each portion of each leg-wheel component, the chassis, and/or any combination thereof. For example, the touch control may be limb specific, or instantiate a central touch control (such as, e.g., for very small or very large vehicles). It should be appreciated that additional information may be conveyed through the touch interface using, e.g., taps, swipes, and/or other known gestures (e.g., for security, actuation, selection, fine control, etc.) Moreover, the touch interfaces may comprise one or more display devices (e.g., a touch screen) capable of displaying information, or may be touch only interfaces without an integrated display device.

Figure 5A:
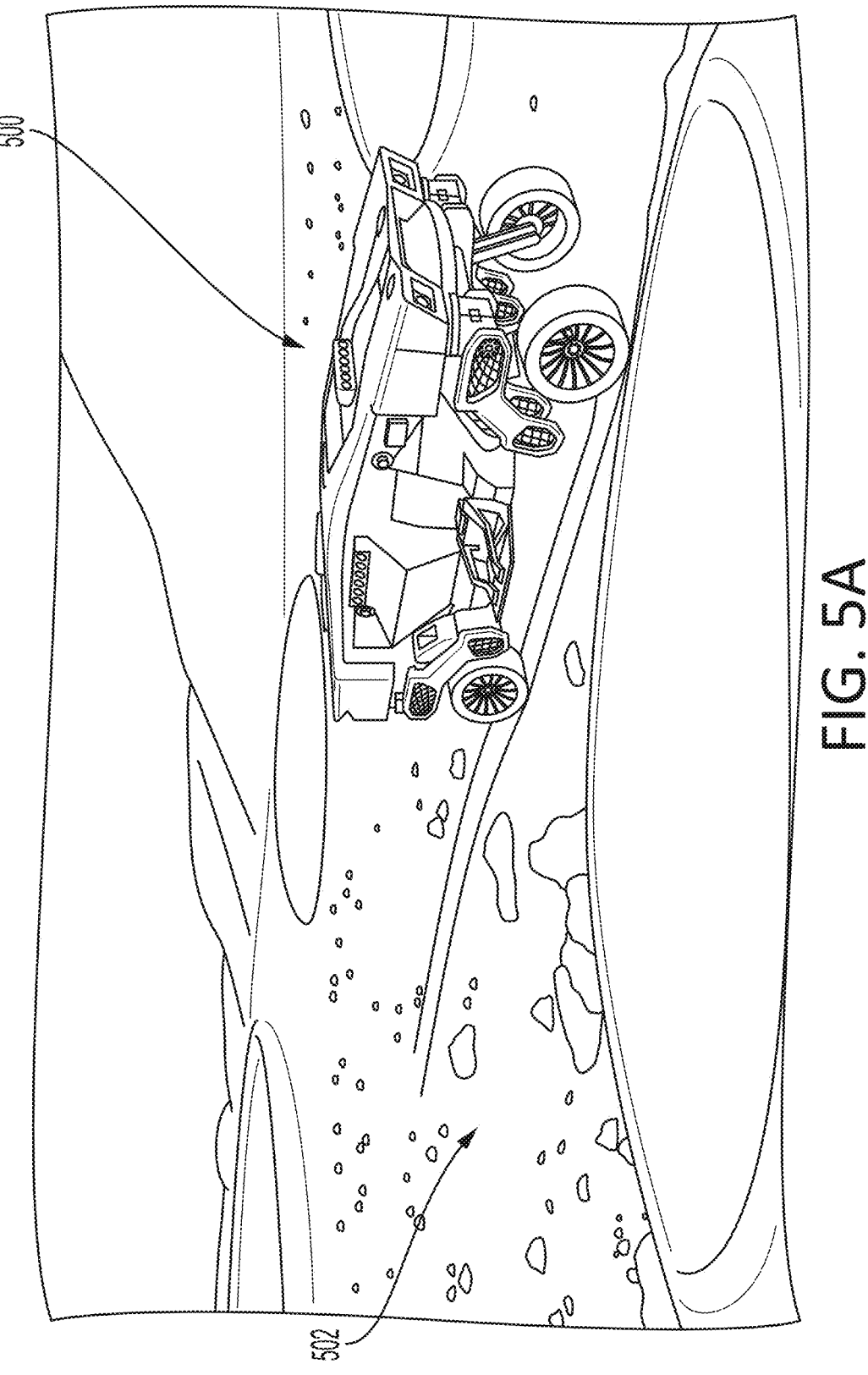
FIG. 5A illustrates an example hybrid vehicle traversing lunar terrain, according to exemplary embodiments of the present disclosure.

Referring now to FIG. 5A, a diagram illustrating a hybrid vehicle 500 traversing a lunar terrain 502 is illustratively depicted, in accordance with an exemplary embodiment of the present disclosure.

According to an exemplary embodiment, the hybrid vehicle of the described embodiments (e.g., hybrid vehicles 100, 300, 500, 600) may be capable of the wheeled and the walking locomotion, and thus may be capable of traversing extreme terrain. The wheeled locomotion may be utilized for rapid traversal of relatively flat terrain, while the walking locomotion may be configured to allow for the traversal of steep, rocky, non-flat terrain that the typical wheeled locomotion is generally incapable of navigating. Such articulation in movement enables exploration of extreme terrains using the walking gaits, as well as travel across flat surfaces using efficient rolling modes. For example, the hybrid vehicle may be configured to scale rough rocks that would otherwise be untraversable using a ground vehicle. Moreover, the leg-wheel components 102 may be configured to be operable to provide omnidirectional travel while providing different walking gaits useful in different types of terrain (e.g., mammalian walking gaits, reptilian walking gaits, etc.), as well as active and passive suspension depending on terrain and travel conditions.

According to some exemplary embodiments, the described hybrid vehicle may be configured to utilize the adaptive, high range of motion suspension (AHROMS) and a whole-vehicle motion control system. When the terrain causes the hybrid vehicle to become stuck or block the wheel component 204 from moving forward, the AHROMS system may be configured to lift and move the wheel component 204 to a place with better traction and/or it can function as a high-travel suspension system to aid in overcoming obstacles. And when needed, the AHROMS may be capable for providing quasi-static walking.

During the walking locomotion, the hybrid vehicle (e.g., hybrid vehicles 100, 300, 500, 600) may be configured to climb slopes of up to 60 degrees and/or travel on side slopes of up to 20 degrees. The hybrid vehicle may comprise a dynamic self-leveling chassis 106 of ±40 degrees on an up/down slope and/or ±20 degrees on a slide slope at full speed. The wheel components 204 of the leg-wheel components 102 may each be configured for individual steering and may comprise the in-wheel hub motors (e.g., in-wheel motors 214) configured to provide all-wheel drive rolling traction. The hybrid vehicle may be configured to maintain balance by providing a stationary or near stationary center of gravity control that enables balance using only three of the four leg-wheel components 102. The four leg-wheel components 102 may be configured to each provide at least 5 degrees of freedom using rotational joints, including a hip abduction degree of freedom, a hip extension degree of freedom, and a knee extension degree of freedom, enabling complete steering control. The locomotion control may be enhanced using the wheel components 204 of each leg-wheel component 102, adding additional degrees of freedom.

According to some exemplary embodiments of the present disclosure, the hybrid vehicle (e.g., hybrid vehicles 100, 300, 500, 600) described herein may be capable of mobility over a wide array of terrains and may be designed to traverse steep, unstable, and uneven terrain. Because such surface conditions are likely to be found on the lunar surface, the described hybrid vehicle may be particularly useful in the exploration of the lunar surface. Furthermore, in accordance with various embodiments, the described hybrid vehicle may comprise a body-on-chassis architecture that may be configured with different bodies 114 that accommodate different types of uses. Moreover, the chassis 106 itself may be physically reconfigured to adopt a shape which best supports the hybrid vehicle's intended use.

The hybrid vehicle (e.g., hybrid vehicles 100, 300, 500, 600) of the described embodiments may be capable of accessing previously unexplored regions of the lunar surface due to its ability to utilize walking locomotion to reach previously inaccessible areas. This could lead to breakthroughs in lunar exploration, allowing for the discovery and mapping of previously inaccessible regions, as well as performing analysis for identifying resources that may ultimately be mined and/or otherwise retrieved. Furthermore, the described hybrid vehicle may be used to establish lunar stations from which further exploration may be performed.

According to an exemplary embodiment, the hybrid vehicle (e.g., hybrid vehicles 100, 300, 500, 600) may be configured to utilize a model predictive controller which may be configured to take advantage of each motor to accomplish one or more tasks efficiently and reliably. Moreover, this flexible and optimization-based framework may allow for many different gaits and locomotion styles in different conditions. For example, machine learning, such as DRL, may be used for control of the hybrid vehicle in determining which form of locomotion to use, as well as which walking gait to use when operating in the walking locomotion.

According to an exemplary embodiment, the hybrid vehicle (e.g., hybrid vehicles 100, 300, 500, 600) may comprise one or more computing devices (e.g., computing device 700). Each of the one or more computing devices may comprise a processor and a memory. According to an exemplary embodiment, the hybrid vehicle may comprise one or more sensors (e.g., onboard image sensor 422, remote image sensor 424, location detector 844, camera(s) 846, LiDAR sensors 848, radar and/or sonar sensors 450, environmental sensors 852, and/or other suitable sensors). The one or more sensors may be configured to record data pertaining to an environment of the hybrid vehicle. The processor may be configured to analyze this data from the one or more sensors in order to determine one or more factors of the environment. The one or more factors may comprise the presence of one or more obstacles, a shape of a surface over which the hybrid vehicle is to navigate, a texture of a surface over which the hybrid vehicle is to navigate, weather phenomena, and/or other suitable factors of the environment. According to an exemplary embodiment, the processor may be configured to analyze the one or more factors of the environment and, based on these one or more factors, select one or more vehicle operation settings. The one or more vehicle operation settings may comprise one or more vehicle operation modes (e.g., a walking vehicle operation mode, a wheeled locomotion vehicle operation mode, etc.), one or more walking gait modes, the vehicle speed, the direction of travel, and/or other suitable vehicle operation settings. According to an exemplary embodiment, the processor may be configured to select the one or more vehicle operation settings without requiring human operator input. According to an exemplary embodiment, the processor may be configured to cause the hybrid vehicle to execute the one or more vehicle operation settings.

According to an exemplary embodiment, the hybrid vehicle (e.g., hybrid vehicles 100, 300, 500, 600) may be capable of operation in environments having extreme temperatures and environmental conditions. Embodiments of the described hybrid vehicle may be capable of operation at very low and very high temperatures, allowing for operation at any time regardless of temperature. The moon temperature can vary from 250° Fahrenheit (120° Celsius) during lunar daytime at the moon's equator to −208° F. (−130° C.) during lunar night, which is approximately two weeks long. As every moment of lunar exploration time is costly, the ability to operate during all temperatures is essential to maximizing available resources. In accordance with various embodiments, the described hybrid vehicle may also be capable of operation in an environment with abrasive dust from the lunar soil. Approximately 10 percent of lunar soil is greater than 1 mm, 50 percent is greater than 100 microns, and 90 percent is greater than 10 microns. The described hybrid vehicle may be designed and configured to withstand the effects of such lunar abrasive dust.

Figure 5B:
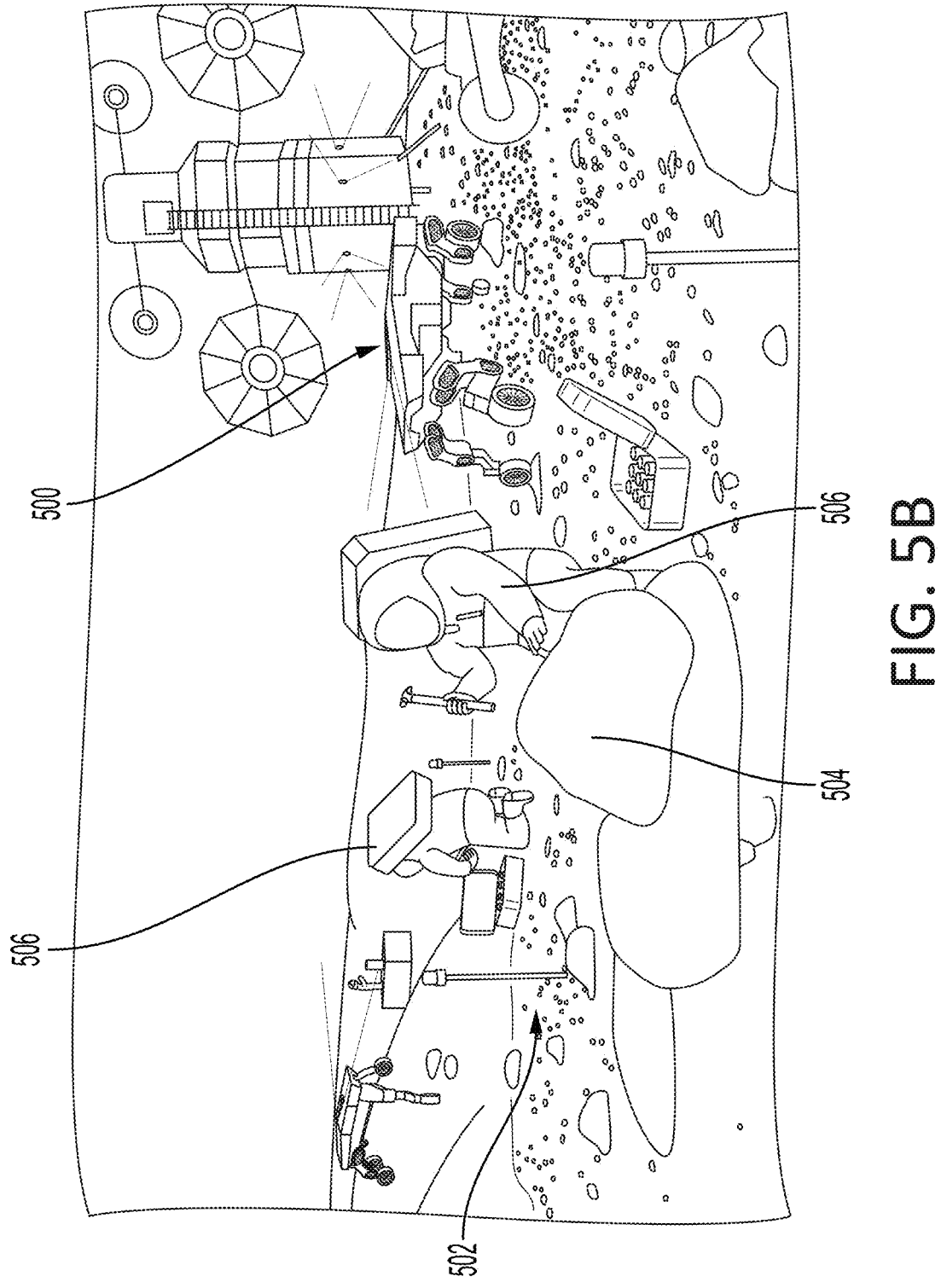
FIG. 5B illustrates an example hybrid vehicle supporting lunar raw material collection and research, according to exemplary embodiments of the present disclosure.
Figure 5C:
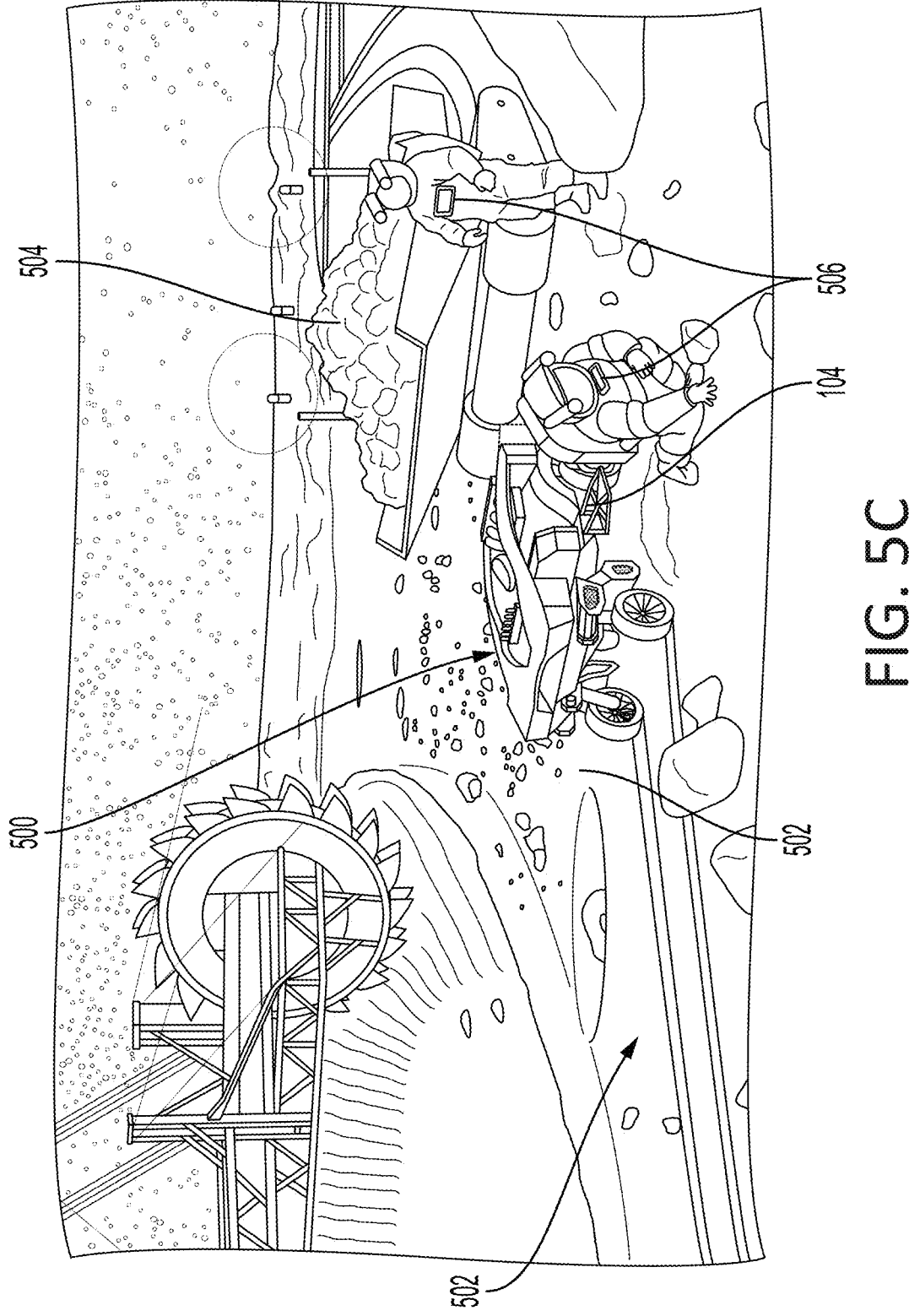
FIG. 5C illustrates an example hybrid vehicle supporting lunar raw material excavation, according to exemplary embodiments of the present disclosure.

Referring now to FIGS. 5A-5B, an illustration (FIG. 4B) of the hybrid vehicle 500 supporting lunar raw material collection and research, and an illustration (FIG. 5C) of the hybrid vehicle 500 supporting lunar excavation, are illustratively depicted, in accordance with some exemplary embodiments of the present disclosure.

According to an exemplary embodiment, during operation, the described hybrid vehicle 500 may be configured to perform and/or support excavation of lunar resources 504 and to transport such excavated lunar resources. The described hybrid vehicle (e.g., hybrid vehicles 100, 300, 500, 600), in various exemplary embodiments, may be configured to excavate, collect raw materials, create trenches, roads, berms, etc., enable In-Situ Resource Utilization, provide surface trafficability, and/or perform ejecta plume mitigation, among other suitable functions.

According to an exemplary embodiment, the hybrid vehicle 500 may be configured to aid in loading, excavating, transporting, and/or disposing of raw materials 504 and regolith. For example, the hybrid vehicle 500 may comprise a tool for rock collection and raw materials collection and/or a tool for creating trenches, roads, and/or berms. According to some exemplary embodiments, the hybrid vehicle 500 may comprise a container 104 (e.g., the cargo pod) configured for collecting and/or transporting the raw materials 504 and regolith. The described UMV (e.g., hybrid vehicles 100, 300, 500, 600) may be configured to support research teams 506 in analyzing surface materials 504 through imaging, scanning, and/or material collection.

Figure 6:
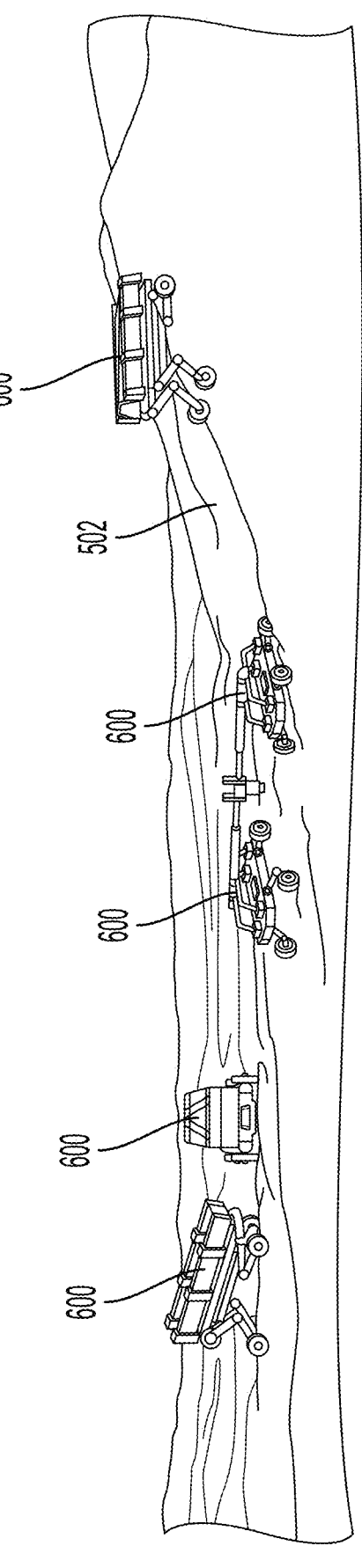
FIG. 6 illustrates example hybrid vehicles supporting lunar construction operations, according to exemplary embodiments of the present disclosure.

Referring now to FIG. 6, the hybrid vehicles 600 supporting lunar construction operations on the lunar terrain 502 are illustratively depicted, in accordance with some exemplary embodiments.

According to an exemplary embodiment, the described hybrid vehicle (e.g., hybrid vehicles 100, 300, 500, 600) may be suited towards support and construction of lunar surface infrastructure. The hybrid vehicle may be designed to withstand harsh terrestrial environmental conditions. The hybrid vehicle may be designed to provide many hours of service on a single battery charge, with wireless charging of the battery through a dust resistant charging means. The hybrid vehicle may be configured for use as a power source itself (e.g., in the event of a lunar system or application requiring a mobile power source). Furthermore, the hybrid vehicle may be designed and configured to carry relatively heavy payloads within specially designed cargo pods 104 which may be adapted to serve particular purposes. In particular, the described hybrid vehicle may be configured to support lunar surface operations by aiding in lunar base construction (e.g., transporting payloads, performing construction task such as digging or erecting structures, etc.), lunar operation support by transporting the payloads between various lunar stations and/or to remote locations, monitoring of remote locations not otherwise accessible using surface means, etc.

Figure 7:
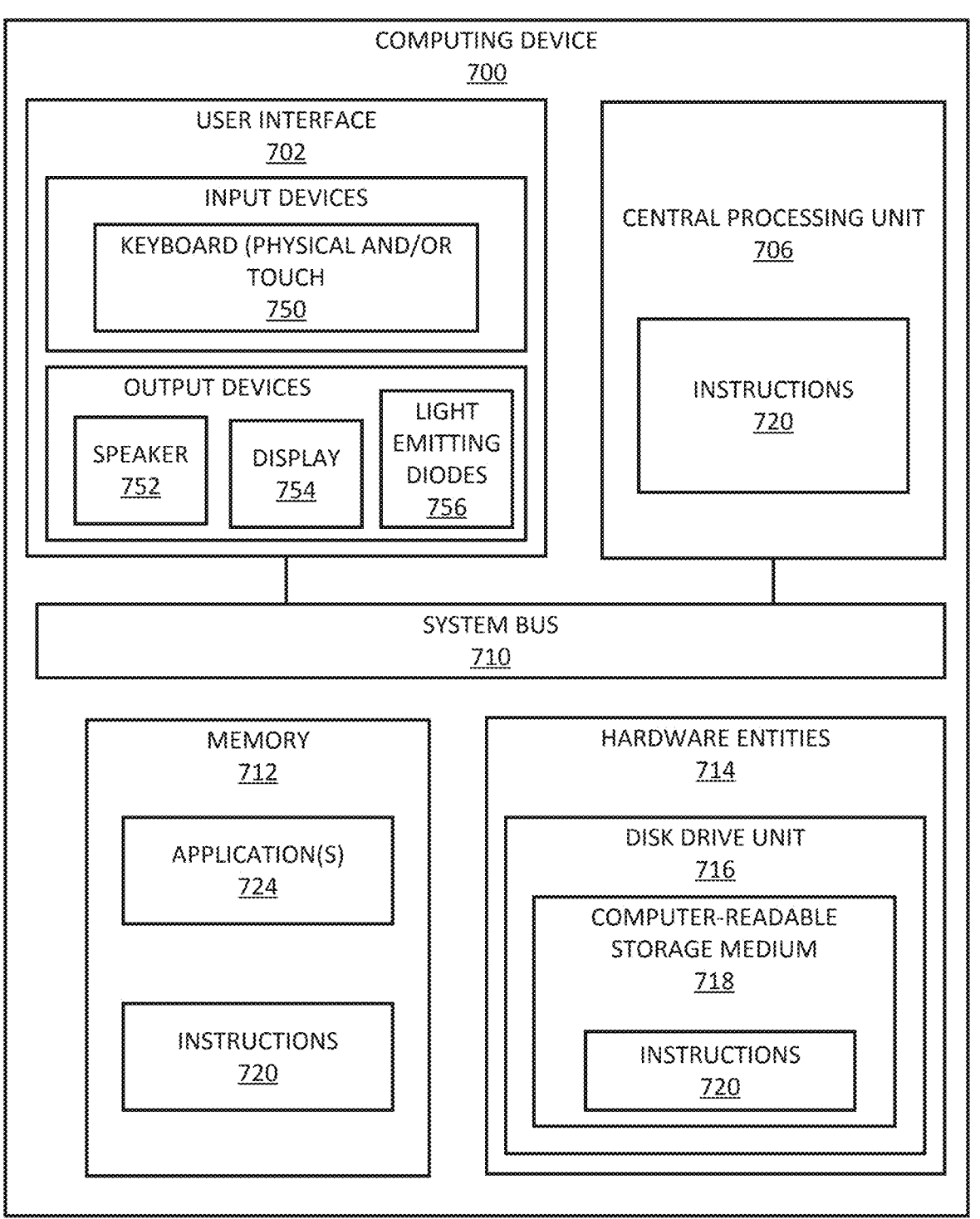
FIG. 7 illustrates example elements of a computing device, according to an exemplary embodiment of the present disclosure.

Referring now to FIG. 7, an illustration of an example architecture for a computing device 700 is provided. According to an exemplary embodiment, one or more functions of the present disclosure may be implemented by a computing device such as, e.g., computing device 700 or a computing device similar to computing device 700.

The hardware architecture of FIG. 7 represents one example implementation of a representative computing device configured to perform one or more methods and means for controlling a vehicle capable of locomotion using both walking motion and rolling traction, as described herein. As such, the computing device 700 of FIG. 7 implements at least a portion of the method(s) described herein and/or implements at least a portion of the functions of the system(s) described herein (e.g., system 400 of FIG. 4).

Some or all components of the computing device 700 may be implemented as hardware, software, and/or a combination of hardware and software. The hardware may comprise, but is not limited to, one or more electronic circuits. The electronic circuits may comprise, but are not limited to, passive components (e.g., resistors and capacitors) and/or active components (e.g., amplifiers and/or microprocessors). The passive and/or active components may be adapted to, arranged to, and/or programmed to perform one or more of the methodologies, procedures, or functions described herein.

As shown in FIG. 7, the computing device 700 may comprise a user interface 702, a Central Processing Unit ("CPU") 706, a system bus 710, a memory 712 connected to and accessible by other portions of computing device 700 through system bus 710, and hardware entities 714 connected to system bus 710. The user interface may comprise input devices and output devices, which may be configured to facilitate user-software interactions for controlling operations of the computing device 700. The input devices may comprise, but are not limited to, a physical and/or touch keyboard 740. The input devices may be connected to the computing device 700 via a wired or wireless connection (e.g., a Bluetooth® connection). The output devices may comprise, but are not limited to, a speaker 742, a display 744, and/or light emitting diodes 746.

At least some of the hardware entities 714 may be configured to perform actions involving access to and use of memory 712, which may be a Random Access Memory (RAM), a disk driver and/or a Compact Disc Read Only Memory (CD-ROM), among other suitable memory types. Hardware entities 714 may comprise a disk drive unit 716 comprising a computer-readable storage medium 718 on which may be stored one or more sets of instructions 720 (e.g., programming instructions such as, but not limited to, software code) configured to implement one or more of the methodologies, procedures, or functions described herein. The instructions 720 may also reside, completely or at least partially, within the memory 712 and/or within the CPU 706 during execution thereof by the computing device 700.

The memory 712 and the CPU 706 may also constitute machine-readable media. The term "machine-readable media", as used here, refers to a single medium or multiple media (e.g., a centralized or distributed database, and/or associated caches and servers) that store the one or more sets of instructions 720. The term "machine-readable media", as used here, also refers to any medium that is capable of storing, encoding or carrying a set of instructions 720 for execution by the computing device 700 and that cause the computing device 700 to perform any one or more of the methodologies of the present disclosure.

Figure 8:
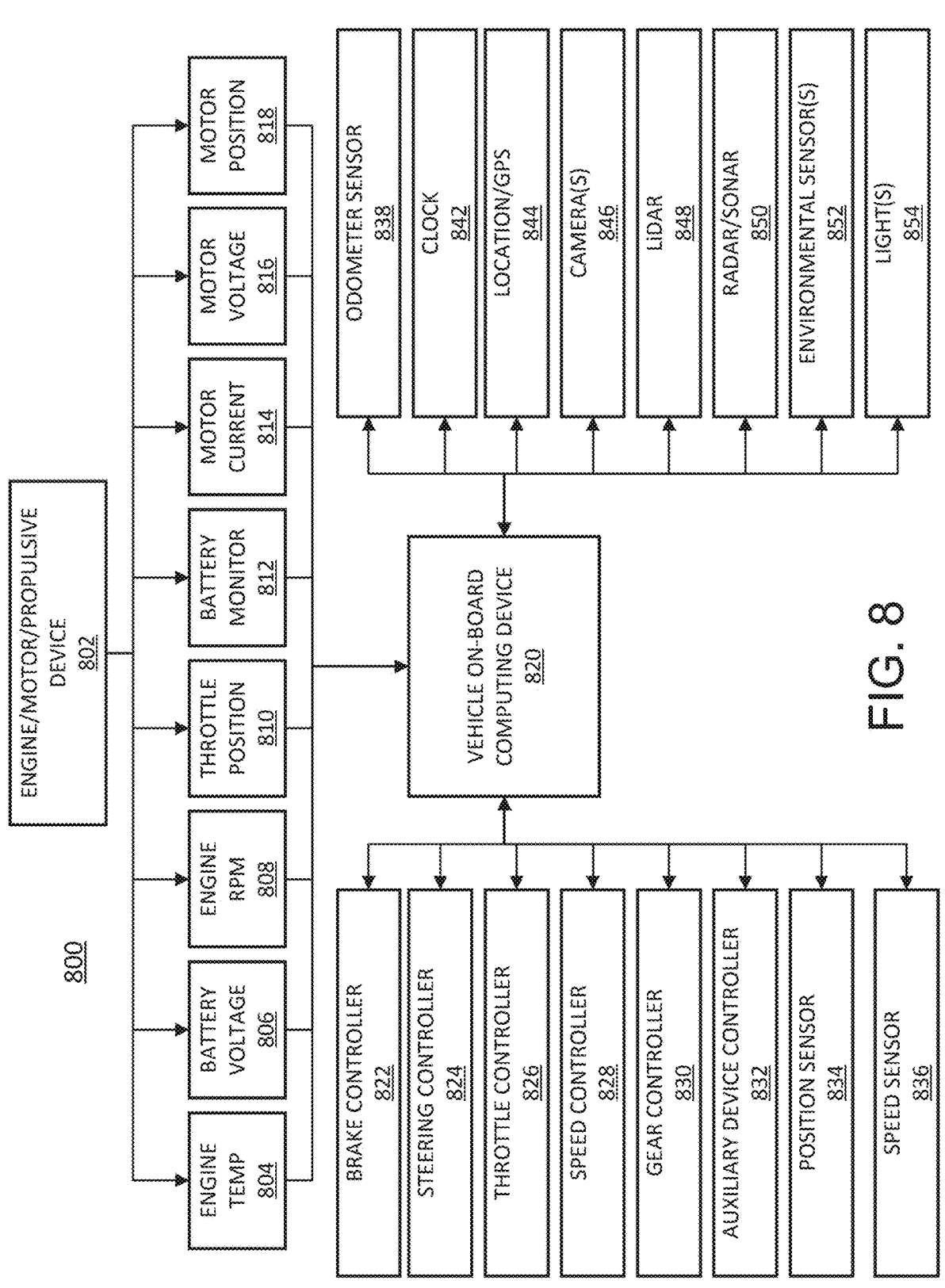
FIG. 8 illustrates an example architecture of a vehicle, according to an exemplary embodiment of the present disclosure.

Referring now to FIG. 8, an example vehicle system architecture 800 for a vehicle is provided, in accordance with an exemplary embodiment of the present disclosure. Hybrid vehicles 100, 300, 500, 600 may have the same or similar system architecture as that shown in FIG. 8. Thus, the following discussion of vehicle system architecture 800 is sufficient for understanding one or more components of hybrid vehicles 100, 300, 500, 600.

As shown in FIG. 8, the vehicle system architecture 800 may comprise an engine, motor or propulsive device (e.g., a thruster) 802 and various sensors 804-818 for measuring various parameters of the vehicle system architecture 800. In gas-powered or hybrid vehicles having a fuel-powered engine, the sensors 804-818 may comprise, for example, an engine temperature sensor 804, a battery voltage sensor 806, an engine Rotations Per Minute (RPM) sensor 808, and/or a throttle position sensor 810. If the vehicle is an electric or hybrid vehicle, then the vehicle may comprise an electric motor, and accordingly may comprise sensors such as a battery monitoring system 812 (to measure current, voltage and/or temperature of the battery), motor current 814 and voltage 816 sensors, and motor position sensors such as resolvers and encoders 818.

Operational parameter sensors that are common to both types of vehicles may comprise, for example: a position sensor 834 such as an accelerometer, gyroscope and/or inertial measurement unit; a speed sensor 836; and/or an odometer sensor 838. The vehicle system architecture 800 also may comprise a clock 842 that the system uses to determine vehicle time and/or date during operation. The clock 842 may be encoded into the vehicle on-board computing device 820, it may be a separate device, or multiple clocks may be available.

The vehicle system architecture 800 also may comprise various sensors that operate to gather information about the environment in which the vehicle is traveling. These sensors may comprise, for example: a location sensor 844 (for example, a Global Positioning System (GPS) device): object detection sensors such as one or more cameras 846; a LiDAR sensor system 848; and/or a RADAR and/or a sonar system 850. The sensors also may comprise environmental sensors 852 such as, e.g., a humidity sensor, a precipitation sensor, a light sensor, and/or ambient temperature sensor. The object detection sensors may be configured to enable the vehicle system architecture 800 to detect objects that are within a given distance range of the vehicle in any direction, while the environmental sensors 852 may be configured to collect data about environmental conditions within the vehicle's area of travel. According to an exemplary embodiment, the vehicle system architecture 800 may comprise one or more lights 854 (e.g., headlights, flood lights, flashlights, etc.).

During operations, information may be communicated from the sensors to an on-board computing device 820 (e.g., computing device 700 of FIG. 7). The on-board computing device 820 may be configured to analyze the data captured by the sensors and/or data received from data providers and may be configured to optionally control operations of the vehicle system architecture 800 based on results of the analysis. For example, the on-board computing device 820 may be configured to control: braking via a brake controller 822; direction via a steering controller 824: speed and acceleration via a throttle controller 826 (in a gas-powered vehicle) or a motor speed controller 828 (such as a current level controller in an electric vehicle); a differential gear controller 830 (in vehicles with transmissions); and/or other controllers. The brake controller 822 may comprise a pedal effort sensor, pedal effort sensor, and/or simulator temperature sensor, as described herein.

Geographic location information may be communicated from the location sensor 844 to the on-board computing device 820, which may then access a map of the environment that corresponds to the location information to determine known fixed features of the environment such as streets, buildings, stop signs and/or stop/go signals. Captured images from the cameras 846 and/or object detection information captured from sensors such as LiDAR 848 may be communicated from those sensors to the on-board computing device 820. The object detection information and/or captured images may be processed by the on-board computing device 820 to detect objects in proximity to the vehicle. Any known or to be known technique for making an object detection based on sensor data and/or captured images may be used in the embodiments disclosed in this document.

What has been described above includes examples of the subject disclosure. It is, of course, not possible to describe every conceivable combination of components or methodologies for purposes of describing the subject matter, but it is to be appreciated that many further combinations and permutations of the subject disclosure are possible. Accordingly, the claimed subject matter is intended to embrace all such alterations, modifications, and variations that fall within the spirit and scope of the appended claims.

In particular and in regard to the various functions performed by the above described components, devices, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter.

The aforementioned systems and components have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components. Any components described herein may also interact with one or more other components not specifically described herein.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

Thus, the embodiments and examples set forth herein were presented in order to best explain various selected embodiments of the present invention and its particular application and to thereby enable those skilled in the art to make and use embodiments of the invention. However, those skilled in the art will recognize that the foregoing description and examples have been presented for the purposes of illustration and example only. The description as set forth is not intended to be exhaustive or to limit the embodiments of the invention to the precise form disclosed.

What is claimed is:

1. A hybrid vehicle, comprising:
   a chassis;
   a plurality of leg-wheel components coupled to the chassis;
   one or more sensors configured to collect data pertaining to an environment of the hybrid vehicle; and
   a processor configured to:

analyze the data, and based on the data, determine one or more factors of the environment of the hybrid vehicle; and select one or more vehicle operation settings, based on the one or more factors of the environment, wherein the plurality of leg-wheel components comprise a leg component and a wheel component, and the plurality of leg-wheel components are configured to be collectively operable to provide wheeled locomotion and walking locomotion, wherein the one or more vehicle operation settings comprise at least one of: one or more vehicle operation modes, one or more walking gait modes, a vehicle speed, or a direction of travel, and wherein the plurality of wheel-leg components utilize at least one of a mammalian walking gait in which the wheel-leg components extend outwards in a direction of travel of the vehicle or a reptilian walking gait in which the wheel-leg components extend outwards perpendicular to the direction of travel during the walking locomotion.

2. The hybrid vehicle of claim 1, wherein the processor is further configured to:

automatically control the hybrid vehicle; and cause the hybrid vehicle to execute the one or more vehicle operation settings.

3. The hybrid vehicle of claim 1, wherein the wheel component is coupled to the leg component.

4. The hybrid vehicle of claim 1, wherein:

the leg component comprises a plurality of segments and one or more joints, and the plurality of segments are configured to rotate about each other via the one or more joints.

5. The hybrid vehicle of claim 1, wherein each of the plurality of leg-wheel components comprise a coupling component configured to couple the leg-wheel component to the chassis.

6. The hybrid vehicle of claim 1, wherein each of the plurality of leg-wheel components comprise an in-wheel motor configured to power movement of one or more of the wheel component and the leg component.

7. The hybrid vehicle of claim 1, wherein:

each of the leg-wheel components is configured to move from a retracted state to an extended state, and movement from the retracted state to the extended state elevates the chassis.

8. The hybrid vehicle of claim 1, wherein each of the plurality of leg-wheel components is configured to move differently from one or more other leg-wheel components of the plurality of leg-wheel components.

9. A system for controlling a hybrid vehicle, comprising:

the hybrid vehicle comprising:

a chassis;

a plurality of leg-wheel components coupled to the chassis; and one or more sensors configured to collect data pertaining to an environment of the hybrid vehicle, wherein the plurality of leg-wheel components comprise a leg component and a wheel component, and the plurality of leg-wheel components are configured to be collectively operable to provide wheeled locomotion and walking locomotion;

wherein the one or more vehicle operation settings comprise at least one of: one or more vehicle operation modes, one or more walking gait modes, a vehicle speed, or a direction of travel;

wherein the plurality of wheel-leg components utilize at least one of a mammalian walking gait in which the wheel-leg components extend outwards in a direction of travel of the vehicle or a reptilian walking gait in which the wheel-leg components extend outwards perpendicular to the direction of travel during the walking locomotion; and a computing device comprising a processor and a memory, the computing device configured to store programming instructions that, when executed by the processor, cause the processor to:

cause the plurality of leg-wheel components to collectively operate to provide wheeled locomotion and walking locomotion;

analyze the data, and based on the data, determine one or more factors of the environment of the hybrid vehicle; and select one or more vehicle operation settings, based on the one or more factors of the environment.

10. The system of claim 9, wherein the programming instructions, when executed by the processor, are further configured to cause the processor to:

automatically control the hybrid vehicle; and cause the hybrid vehicle to execute the one or more vehicle operation settings.

11. The system of claim 9, wherein the wheel component is coupled to the leg component.

12. The system of claim 9, wherein:

the leg component comprises a plurality of segments and one or more joints, and the plurality of segments are configured to rotate about each other via the one or more joints.

13. The system of claim 9, wherein each of the plurality of leg-wheel components comprises a coupling component configured to couple the leg-wheel component to the chassis.

14. The system of claim 9, wherein each of the plurality of leg-wheel components comprise an in-wheel motor configured to power movement of one or more of the wheel component and the leg component.

15. The system of claim 9, wherein:

each of the leg-wheel components is configured to move from a retracted state to an extended state, movement from the retracted state to the extended state elevates the chassis, and the programming instructions, when executed by the processor, are configured to cause each of the leg-wheel components to move from the retracted state to the extended state.

16. The system of claim 9, wherein each of the plurality of leg-wheel components is configured to move differently from one or more other leg-wheel components of the plurality of leg-wheel components.

* * * * *